(12) United States Patent
Ditner et al.

(10) Patent No.: US 6,845,467 B1
(45) Date of Patent: Jan. 18, 2005

(54) SYSTEM AND METHOD OF OPERATION OF DUAL REDUNDANT CONTROLLERS

(75) Inventors: John Ditner, New Hamburg (CA); Marc Morin, Waterloo (CA)

(73) Assignee: Cisco Systems Canada Co., Halifax (CA)

( * ) Notice: Subject to any disclaimer, the term of this patent is extended or adjusted under 35 U.S.C. 154(b) by 613 days.

(21) Appl. No.: 09/782,917

(22) Filed: Feb. 13, 2001

(51) Int. Cl.$^7$ .............................................. G06F 11/00
(52) U.S. Cl. ........................................ 714/11; 714/10
(58) Field of Search ............................. 714/10, 11, 12, 714/47

(56) References Cited

U.S. PATENT DOCUMENTS

| | | | |
|---|---|---|---|
| 3,864,670 A | 2/1975 | Inooue et al. ............ 340/172.5 |
| 4,466,098 A | 8/1984 | Southard ........................ 371/9 |
| 4,521,871 A | 6/1985 | Galdun et al. .............. 364/900 |
| 4,797,884 A | 1/1989 | Yalowitz et al. ................ 371/9 |
| 4,958,270 A | 9/1990 | McLaughlin et al. ....... 364/187 |
| 5,136,384 A | 8/1992 | McLaughlin et al. ....... 364/184 |
| 5,138,708 A | 8/1992 | Vosbury ...................... 395/575 |
| 5,426,774 A | 6/1995 | Banerjee et al. ............ 395/575 |
| 5,491,788 A | 2/1996 | Cepulis et al. ......... 395/182.21 |
| 5,530,946 A | 6/1996 | Bouvier et al. ........ 395/182.21 |
| 5,752,047 A | 5/1998 | Darty et al. ........... 395/705.01 |
| 5,768,623 A | 6/1998 | Judd et al. .................. 395/857 |
| 5,777,874 A | 7/1998 | Flood et al. ................ 364/187 |
| 5,928,367 A | 7/1999 | Nelson et al. .................. 714/6 |
| 5,951,683 A | 9/1999 | Yuuki et al. .................. 713/1 |
| 5,958,069 A | 9/1999 | Kawasaki et al. ............ 714/11 |
| 5,966,305 A | 10/1999 | Watari et al. ............... 364/187 |
| 5,968,185 A | 10/1999 | Bressoud et al. ............. 714/10 |
| 5,974,565 A | 10/1999 | Okuhara et al. .............. 714/11 |
| 6,038,684 A | 3/2000 | Liddell et al. ................ 714/24 |
| 6,058,491 A | 5/2000 | Bossen et al. ................ 714/15 |
| 6,169,726 B1 * | 1/2001 | Dempsey et al. ........... 370/219 |
| 6,308,286 B1 * | 10/2001 | Richmond et al. ........... 714/13 |
| 6,351,829 B1 * | 2/2002 | Dupont et al. ................ 714/48 |
| 6,578,158 B1 * | 6/2003 | Deitz et al. ................... 714/11 |
| 6,587,970 B1 * | 7/2003 | Wang et al. .................. 714/47 |
| 6,640,314 B1 * | 10/2003 | Lelaure et al. ................ 714/11 |
| 6,643,795 B1 * | 11/2003 | Sicola et al. ................... 714/6 |
| 2003/0115500 A1 * | 6/2003 | Akrout et al. ................ 714/10 |

OTHER PUBLICATIONS

ISO/IEP "Information Technology–Generic Coding of Moving Pictures and Associated Audio: Systems," ISO/IEC 13818–1 Nov. 13, 1994, 135 Pages.
ISO/IEP "Information Technology–Generic coding of moving pictures and associated audio information: Video", ISO/IEC 13818–2, 1995, 209 Pages.
ISO/IEP Information Technolgy–Generic Coding of Moving Pictures and Associated Audio: Audio, ISO/IEP 13808–3, Nov. 11, 1994, 104 Pages.

* cited by examiner

Primary Examiner—Nadeem Iqbal
Assistant Examiner—Timothy M. Bonura
(74) Attorney, Agent, or Firm—Beyer Weaver & Thomas, LLP

(57) ABSTRACT

A system and method for the switching of control between redundant controllers is presented. The status of the redundant controllers is monitored to determine if switching of control between controllers is required. The monitoring and switching system is hardware based with control being implemented via a state machine.

25 Claims, 3 Drawing Sheets

SYSTEM AND METHOD OF OPERATION OF DUAL REDUNDANT CONTROLLERS

FIELD OF THE INVENTION

The invention relates generally to computer systems, and more particularly to a system and method of improving the reliability of a computer system through the implementation of a redundant controllers.

BACKGROUND OF THE INVENTION

The provision of redundant systems in areas where uninterrupted operation is required are well known. Such uninterrupted operations may be desired for any combination of economic and safety considerations. Redundant control systems are found in many industrial settings including; chemical plants and utility power systems. Redundant control systems are also employed in real time computer and communications systems as might by used in on-line data processing systems as are used in banking and telephone switching, for example. It is also often the case where critical systems are located in remote, difficult to access or hazardous locations. In such cases the provision of redundancy not only allows for improved operational reliability but allows for system maintenance and software or firmware upgrading to be performed remotely as the operations can be assigned to the system that is not currently being upgraded.

The required level of reliability can often be provided with redundancy in the important components of a system. Limiting the redundant components to those along critical paths reduces the costs associated with providing the required reliability. Controllers are one component that perform critical operations and are therefore often provided with redundancy.

A system of redundant controllers will include a primary controller that is in control at any given time and one or more secondary controllers that are available to take control of the system. It is common in the art to refer to the primary controller as the "active" controller while the secondary or redundant controllers are known as "standby" controllers.

Standby controllers are generally run in one of two modes with respect to the active controller. In the first mode the standby is run in a synchronous manner with respect to the active. The two controllers execute the same programs and have identical status at any given time. This allows for fast seamless switching of control between controllers as the two controllers are executing the same instructions i.e. there is no time required to bring the standby controller to the same point as the active. Minor 'natural' asynchronicities are often encountered during normal operation, thereby minimizing the advantages of a synchronous system. Alternatively the active and standby controllers could be run in an asynchronous manner. The standby controller is no longer running in step with the active controller rather it is often run with a certain lag time as compared to the active controller. While this second approach requires more time for the standby to assume operations from the active it is easier to run the controllers asynchronously.

In any system employing redundancy there is a need to determine when an error has occurred in the operation of the active controller and a system to switch control from the active to standby controller when such an error has occurred. The detection of a fault in the operation of the active controller and the switching of control can be performed by either software or hardware based methods. The use of one of these approaches generally reflects the role of the redundant controller within the computer system. Software based methods are often used when the redundant controller is the main processing element of the computer. In these situations the output data of the active controller is compared to that of the standby controller(s). It is also possible to monitor signals from the active controller. This is often performed by hardware based methods where the change of a signal initiates a change in the operation of the active controller.

Software based methods are often focussed on the comparison of output data from the controllers. In one example the controllers are run asynchronously with the data of the lead controller being placed in a buffer. When the lagging controller reaches the same point in its operation as that of the data from the lead controller the two sets of data are compared in a comparator. In another example of software based failure detection and control the controllers are run in a synchronous fashion. Output data from the two controllers is placed on one of two buses and compared to one another. Finally, in cases where there are more than two controllers operating the data of the controllers is compared. If two or more of the controllers are in agreement they are determined to be operating correctly while the one that does not agree is seen to be operating incorrectly.

The second general category of failure detection and switching circuits use hardware based methods where hardware based methods are those that use a control circuit to monitor status signals from the controllers. The status signals from the controllers indicate the state of the controller's operation and determine whether a switchover of active control is required. The control circuits that monitor the controllers often employ some form of control logic and a timer circuit to which the controllers must regularly respond to indicate that it is still active and in control. The above hardware based systems are generally simpler than software based systems and use signals from the controllers being monitored as their input.

Both hardware and software based monitor and control systems are often used is systems in dual processing environments. In such a situation the processors are usually mounted on the same board and they are not designed to be inserted or removed during operation of the system. Thus the monitor and control system does not contemplate these situations. The systems therefore do not reflect the functionality associated with rack based computer systems where redundant controllers may be located on separate boards that are likely to be removed during the operation of the computer.

Therefore, there is a need for a system and method for the operation of dual redundant controllers of a rack based computer systems. The system and method of operation should contemplate the requirement of a stable handover of control with a minimum of downtime as is required in the broadcast industry.

SUMMARY OF THE INVENTION

The invention presents a system and method for the switching of control between redundant controllers. The status of the redundant controllers is monitored by the system of the invention to determine if switching of control between controllers is required. The monitoring and switching system of the invention is hardware based with control being implemented via a state machine.

In accordance with one aspect of the invention a system for monitoring the status of and switching control between a pair of redundant controllers; wherein one controller is functioning as an active controller and one controller is functioning as a standby controller is presented. The system comprises; two monitors, each monitor being connected to and associated with a controller, wherein the two monitors are capable of receiving status signals from the controller with which they are associated, two communication links between the two monitors for exchanging status signals associated with the status of the controllers with which the monitors are associated, and two triggers, each trigger connected to and associated with a controller, each monostable trigger further connected to the monitor associated with each controller, wherein the triggers provide a signal for the controller with which it is associated.

In accordance with another aspect of the invention a computer suitable or use in an application requiring reliability of operation is provided. The computer comprises; a first controller, the first controller operating as an active controller, a second controller, the second controller operating as a standby controller, wherein the second controller is capable of assuming the operations performed by the first controller, the first and second controller forming a pair of redundant controllers, a first logic device connected to and associated with the first controller, wherein the first logic device is suitable to receive status signals from the first controller, a second logic device connected to and associated with the second controller, wherein the second logic device is suitable to receive status signals from the second controller, two triggering means, each triggering means connected to and associated with a controller, the triggering means further connected to the logic device associated with the controller with which the triggering means is associated, the triggering means providing a signal to the controller, and two communications links providing for communications between the first and second logic devices.

In accordance with another aspect of the invention a state machine for the arbitration of control between two redundant controllers, the state machine being implemented as logic on a logic device wherein the state machine permits only one of the two redundant controllers to be an active controller, the two controllers being able to set status signals in a manner indicting either their current or future status is provided. The state machine comprising; an active state wherein the active controller resides in the active state when the redundant controllers are not arbitrating to determine the active controller, a standby state wherein the controller that is not the active controller resides in the standby state when the controllers not arbitrating to determine the active controller, a first decision front, the first decision front being entered when the standby controller forcibly attempts to become the active controller, a second decision front, the second decision front being entered when the active controller requests to become the standby controller, and a third decision front, the third decision front being entered by the active controller when the active controller is to become the standby controller.

In accordance with another aspect of the invention a method by which a standby controller forcibly becomes the active controller is presented. The method comprising the steps of; setting a parameter low by the standby controller, the parameter indicating that the standby controller is to forcibly become the active controller, entering a first decision front of a state machine, the first decision front containing a plurality states, setting a status signal of the standby controller to indicate it is the active controller, and maintaining the status signal of the standby controller to indicate it is the active controller throughout the plurality of states in the first decision front.

In accordance with another aspect of the invention a method by which a standby controller becomes the active controller when the active controller has indicated it is to become the standby controller by setting a status signal indicating it is the active controller low, the active and standby controllers being able to communicate status signals though monitors associated with the active and standby controllers, the monitors being able to monitor status signals of the controller with which they are associated and status signals of the controller with which they are not associated is presented. The method comprising the steps of; setting a status signal of the standby controller high, indicating the standby controller is to remain the standby controller, monitoring a status signal of the active controller, by the monitor associated with the standby controller, remaining as the standby controller if the status signal of the active controller is set low, setting a status signal of the standby controller high, indicating the standby controller is to remain the standby controller if an identification parameter of the standby controller has a certain value, monitoring a status signal of the active controller, by the monitor associated with the standby controller, and remaining as the standby controller if the status signal of the active controller is set low.

In accordance with another aspect of the invention a method by which an active controller becomes the standby controller when the standby controller has indicated it is to become the active controller by setting a status signal indicating it is the active controller low, the active and standby controllers being able to communicate status signals though monitors associated with the active and standby controllers, the monitors being able to monitor status signals of the controller with which they are associated and status signals of the controller with which they are not associated is presented. The method comprising the steps of; setting a status signal of the active controller low, indicating the active controller is to remain the active controller, monitoring a status signal of the standby controller, by the monitor associated with the active controller, remaining as the active controller if the status signal of the standby controller is set high, setting a status signal of the active controller high, indicating the active controller is to remain the active controller, monitoring a status signal of the active controller, by the monitor associated with the standby controller, and remaining as the active controller if the status signal of the standby controller is set high.

Other aspects and advantages of the invention, as well as the structure and operation of various embodiments of the invention, will become apparent to those ordinarily skilled in the art upon review of the following description of the invention in conjunction with the accompanying drawings.

BRIEF DESCRIPTION OF THE DRAWINGS

The invention will be described with reference to the accompanying drawings, wherein.

DETAILED DESCRIPTION OF EMBODIMENTS OF THE INVENTION

The invention provides a system and method for monitoring and switching control between dual redundant controllers. The invention is suitable for use in an industrial computer where an industrial computer is a computer that comprises a passive plane. This passive plane is appropriate for the acceptance of one or more peripheral boards where the peripheral boards provide the desired functionality to the industrial computer.

Figure 1:
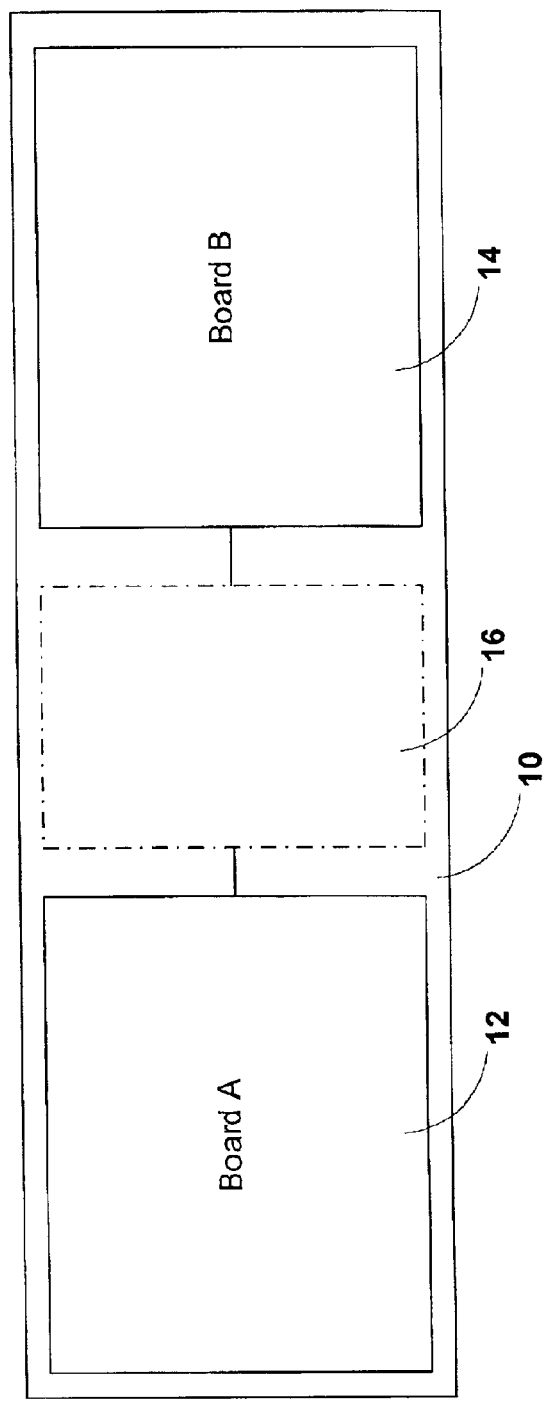
FIG. 1 is a schematic diagram of a system in which one embodiment of the invention is suitably used.

A schematic diagram of portions of an industrial computer that contains the system of an embodiment of the invention is illustrated in FIG. 1. Industrial computer 10 contains boards 12 and 14. Boards 12 and 14 are inserted in and connected to passive plane 16 of industrial computer 10. Passive plane 16 generally provides for communications within the industrial computer and particularly provides for communications between boards 12 and 14. Boards 12 and 14 each contain a controller which form a pair of redundant controllers. The active controller of the pair of redundant controllers monitors communications on passive plane 16. Boards 12 and 14 contain additional elements that form a system for monitoring the operation of and switching of control between the controllers.

Figure 2:
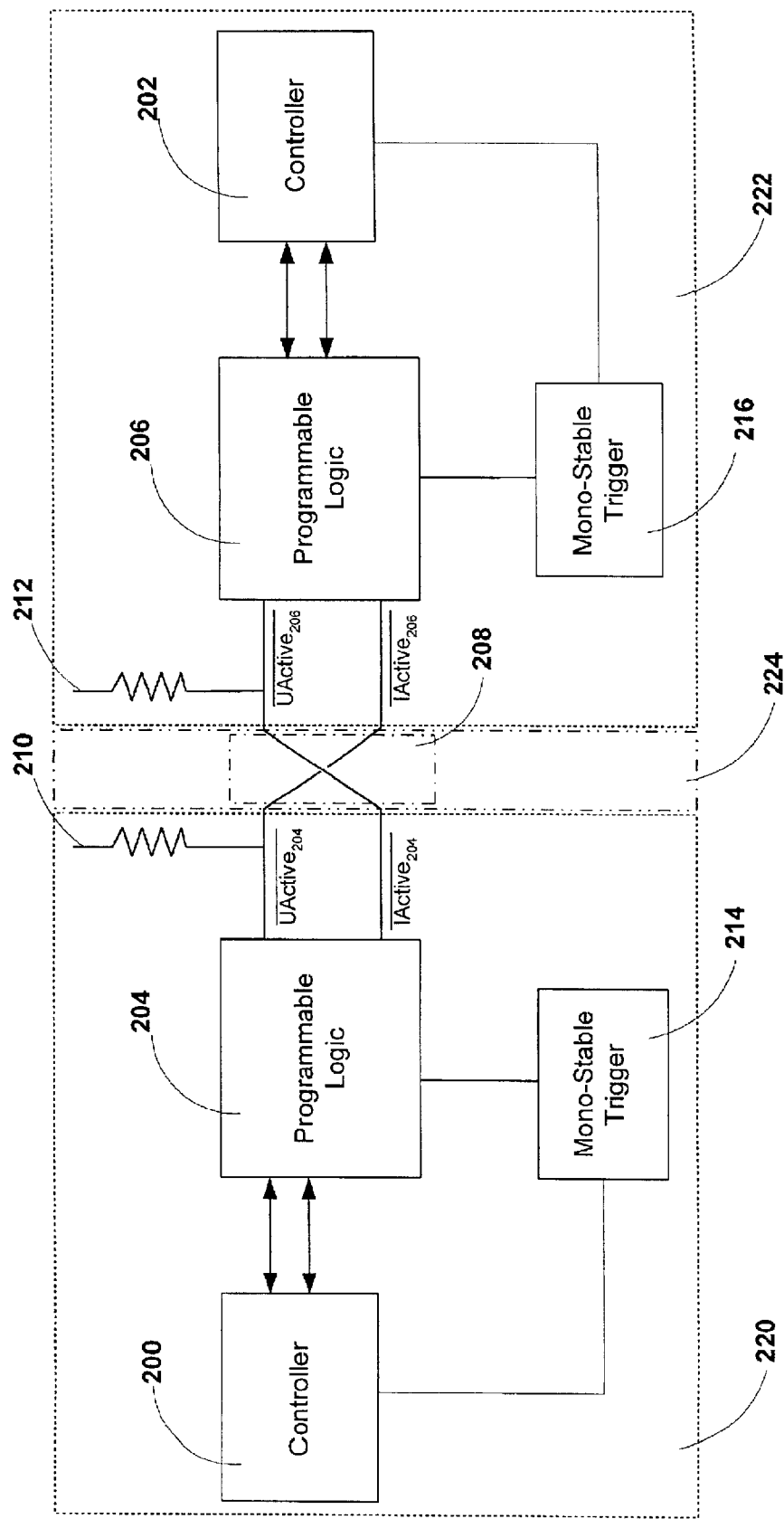
FIG. 2 is a schematic diagram of the system of another embodiment of the invention.

A schematic diagram of the system of the current embodiment of the invention is shown in FIG. 2. Controllers 200 and 202 are identical controllers that form dual redundant controllers. One of controllers 200 and 202 will be the active controller while the other controller will be the standby controller. One of the functions of the active controller is the monitoring and control of communications amongst peripheral boards. These communications are facilitated by a USB comprised by the industrial computer of the current embodiment. The active controller further acts as a communications bridge between the peripheral boards of the industrial computer and any external control point. The active controller of controllers 200 and 202 does not take part in the operation of the industrial computer.

Programmable logic devices 204 and 206 are connected to and associated with controllers 200 and 202, respectively. In the current embodiment programmable logic devices 204 and 206 are Field Programmable Gate Arrays (FPGA). FPGAs 204 and 206 are connected to one another by cross-link 208 which facilitates the exchange of status signals between FPGAs 204 and 206. These status signals reflect the status of the controller with which the FPGA are associated and monitors. $\overline{IActive}$ signals are generated by FPGAs 204 and FPGA 206. The $\overline{IActive}$ signal generated by a given FPGA is monitored as a $\overline{UActive}$ input to the other FPGA. Pull-up resistors 210 and 212 are each attached to a link of cross-link 208. Mono-stable triggers or "one-shots" 214 and 216 are attached to and associated with controllers 200 and 202, respectively. Mono-stable triggers 214 and 216 are also connected to and associated with FPGAs 204 and 206, respectively.

Elements of the system for monitoring the operation of and switching of control between the dual redundant controllers can be partitioned into groupings of components associated with controllers 200 and 202. These groupings are comprised by regions 220 and 222. In the current embodiment regions 220 and 222 are two boards of an industrial computer. These boards are connected to midplane 224 which forms a passive plane of the industrial computer. This connection is formed by inserting boards 220 and 222 into slots suitable for accepting boards located on midplane 224. Cross-link 208 is located on midplane 224. Cross-link 208 is implemented as wiring lines in the printed circuit board that forms midplane 224. The system of the current embodiment allows all active components to be removed from midplane 224.

FPGAs 204 and 206 contain logic, programmed as firmware, that is used to monitor the operation of controllers 200 and 202 and switch control from the active controller to the standby controller. FPGAs 204 and 206 monitor the status of controllers 200 and 202 and mono-stable triggers 214 and 216, respectively. FPGAs 204 and 206 generate status signals that are directly related to the status of the controllers with which they are associated. FPGAs 204 and 206 also monitor status signals of the other FPGA. In FIG. 2 one is used to represent a high state while zero is used to represent a low state. It will apparent to one skilled in the art that this choice of numbers is arbitrary and any appropriate combination of numbers could be used. These signal are referenced in FIG. 2 with respect to the FPGA with which they are associated. Logic that controls the switching of control from one controller to the other is implemented as a state machine in the FPGA. The state machine determines the future state of the redundant controllers based on their current state and any inputs to the state machine. The configuration and operation of the state machine will be discussed in greater detail in the discussion of the operation of the invention.

Cross-link 208 connects the $\overline{IActive}$ output from each FPGA to the corresponding $\overline{UActive}$ input of the other FPGA. The state of the $\overline{IActive}$ output of FPGA 204 is monitored by the $\overline{UActive}$ input of FPGA 206. Similarly the state of the $\overline{IActive}$ output of FPGA 206 is monitored by the $\overline{UActive}$ input of FPGA 204. $\overline{IActive}$ is the status signal from each controller which, when low, indicates that the controller is either in control or requesting control. The $\overline{UActive}$ input allows each controller to monitor the state of the $\overline{IActive}$ output of the other controller.

Mono-stable triggers 214 and 216 provide a timeout which the active controller must retrigger periodically for it to remain as the active controller. In the current embodiment the mono-stable triggers are set for a 500 ms time out. If the active controller does not retrigger the mono-stable trigger prior to its timeout control will be switched to the standby controller. The switching of control due to a time out of the mono-stable trigger takes place as part of the normal arbitration process. The circuitry forming mono-stable triggers 214 and 216 and the operation thereof will be known to those of skill in the art.

Pull-up resistors 210 and 212 are attached to each link of cross-link 208 connecting $\overline{IActive}$ and $\overline{UActive}$ signals of the FPGAs. In the event that a board, e.g. 220 containing controller 200, is removed from midplane 224 FPGA 206 would see a floating input in the absence of pull-up 210. Thus, pull-ups 210 and 212 ensure the presence of a stable $\overline{UActive}$ signal and thus the proper functioning of logic in the FPGAs. This ensures that removal of the standby controller will not disrupt the control of the active controller. It likewise ensures that removal of the active controller will result in the standby controller assuming the role of active controller as part of the arbitration process.

In the current embodiment the system of dual redundant controllers is designed such that control can be switched from the active to the standby controller in cases of failure of the active controller or when the standby controller requests control. Events that are encompassed in these categories include; system initialisation, failure of the active controller, loss of signal from the active controller, physical removal of the active controller. It will be apparent to one skilled in the art that there may be other events that could initiate a change of control from the active to the standby controller that are encompassed by the system and methods of the invention.

The switching of control from the active to standby controller is controlled by logic in FPGAs 204 and 206. This logic forms an identical state machine in each FPGA. These state machines operate asynchronously from one another and as such the state that one state machine may be in does not force the opposite state machine to be in any particular state. The future state of a state machine, and thus the elements it controls, is determined by its current state and inputs to it. These inputs comprise status signals from the controllers with which the state machines (FPGA) are associated, status signals from the other state machine and signals from the mono-stable triggers. The operation of the state machine will now be discussed in detail.

Figure 3:
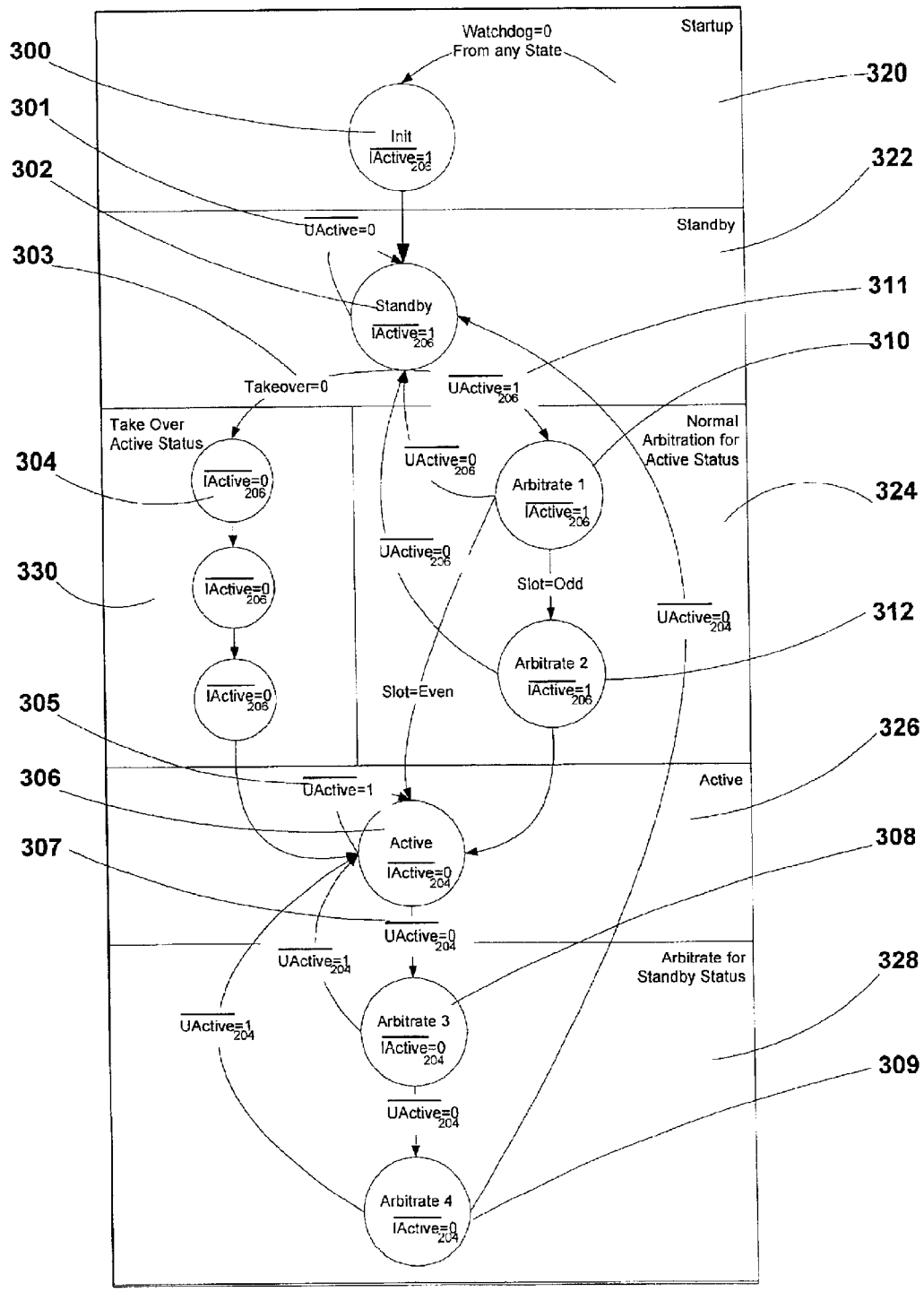
FIG. 3 is a schematic diagram of the state machine and the arbitration states, for the arbitration of active status for the two controllers contained therein state machine according to one embodiment of the invention.

FIG. 3 is a schematic diagram illustrating the various states of the state machines and their movement from one state to another state. The state machine is designed to ensure that only one controller is active on the bus at any one time. It further has provisions to allow the standby controller to request control from the currently active controller and to allow the active controller to hand over control in cases where there is an error in the operation of the active controller. The state machine contains six decision fronts to provide for the above functionality. A given decision front may comprise a single state or may comprise multiple states.

The following discussion of the state machines and operation thereof discusses the state of controllers 202 and 204. While controller 202 and 204 are acting as either the active or standby controller it will be apparent to one skilled in the art that it is the FPGAs associated with these controllers on which the state machines are located and operative. Thus it is the FPGAs that traverse the various states of the state machine. It will be assumed that controller 200 initially acts as the active controller while controller 202 initially acts as the standby controller. This assumption of active and standby controller is purely for exemplary purposes. System initialisation occurs in decision front 320, the "Start-up" decision front. $\overline{\text{IActive}}_{206}$ of controller 202 is set high in state 300 indicating that it is not in control. State 302 is then entered. During operation, with no change of control taking place, controller 202 remains in state 302 (region 322) and controller 200 in state 306 (region 326). Controller 202 will remain in state 302 until either; it sets the Takeover bit low (303) as it wishes to take control or its $\overline{\text{UActive}}_{206}$ input (i.e. the $\overline{\text{IActive}}_{204}$ ouput of controller 200) goes high (311) indicating that controller 200 is no longer in control.

If the Takeover bit is set low by controller 202 controller 202 is forcibly taking control from controller 200. During this process controller 202 moves from region 322 to region 330. Controller 202 remains in region 330 with $\overline{\text{IActive}}_{206}$ set low (304) for three clock cycles. After the third clock cycle controller 202 becomes the active controller and enters region 326 of the state machine. When controller 202 moves through region 330 it maintains its $\overline{\text{IActive}}_{206}$ output low. This is seen by controller 200 as a low on its $\overline{\text{UActive}}_{204}$ input. In response to this controller 200 moves through decision front 328 and enters region 322 where it assumes the role of standby controller. At this point the controllers have completed a role reversal, with the active becoming the standby and the standby becoming the active controller.

Returning to the state where controller 200 is active and controller 202 is in a standby state another switching of control will be described. When controller 200 has allowed its $\overline{\text{IActive}}_{204}$ input to go high the $\overline{\text{UActive}}_{206}$ input of controller 202 goes high. Controller 200 may allow its $\overline{\text{IActive}}_{204}$ output to go high in fault situations including but not necessarily limited to, a hardware fault associated with controller 200 or physical removal of it. This is seen at the $\overline{\text{UActive}}_{206}$ input of controller 202. With $\overline{\text{UActive}}_{206}$ set high controller 202 moves to state 310 of decision front 324, i.e. "Normal Arbitration for Active Status". Decision front 324 contains two states; Arbitrate 1 310 and Arbitrate 2 312. In both state 310 and 312 the $\overline{\text{IActive}}_{206}$ output is set high and the state of the $\overline{\text{UActive}}_{206}$ input is monitored. If $\overline{\text{UActive}}_{206}$ is found to be low in either state 310 or 312, it determines that controller 200 is still active. Accordingly controller 202 returns to state 302 and remains the standby controller. Controller 202 moves from state 310 to state 312 if it is comprised by a board that is inserted in an odd numbered slot of midplane 224. If controller 202 is comprised by a board that is inserted in an even numbered slot of midplane 224, controller 202 moves to state 206.

Decision front 328 is entered when the initially active controller assumes standby status. Controller 200 is initially the active controller i.e. it resides in state 306 with $\overline{\text{IActive}}_{204}$ low. Controller 202 has indicated it is to become the active controller by setting its $\overline{\text{LActive}}_{206}$ output low which drives the $\overline{\text{UActive}}_{204}$ input of controller 200 low, step 307. This occurs when the controller 202 passes through either decision front 330 or 324. Controller 200 moves to state 308 or Arbitrate 3. In state 308 controller 200 maintains its $\overline{\text{IActive}}_{204}$ output low and monitors its $\overline{\text{UActive}}_{204}$ input. If controller 202 sets its $\overline{\text{IActive}}_{206}$ output low controller 200 moves to state 309 or Arbitrate 4. Again controller 200 maintains its $\overline{\text{IActive}}_{204}$ output low and monitors its $\overline{\text{UActive}}_{204}$ input. If controller 202 again sets its $\overline{\text{IActive}}_{206}$ output low controller 200 now enters standby state 302 and a change of control has occurred. If at either state 308 or 309 the $\overline{\text{UActive}}_{204}$ input of controller 200 goes high controller 200 is returned to active status i.e. state 306.

When controller 200 and controller 202 are provided in an even slot and an odd slot of the midplane the state machine provides for contention avoidance at powerup. This would normally occur if both controllers poweredup and entered state 300 at the same instant. During Arbitrate 1 (state 310) the state machine determines if the board on which controller 200 is located in an even or an odd numbered slot of the midplane of the industrial computer. If the board containing controller 200 is located in an even slot controller 202 is moved to state 306 of region 326 where it becomes the active controller. If on the other hand controller 200 is located in an odd slot controller 202 moves to state 312 or Arbitrate 2. State 312 has been added as a delay such that the two controllers do not reach state 306 i.e. active state, at the same time. The controller that does not have to travel through state 312 will reach state 306 first and assume active status. In moving from either state 310 or 312 to state 306 controller 202 sets its $\overline{\text{IActive}}_{206}$ output low to indicate that it is now in control.

Movement through the state machine reflects the reaction of the state machine to external inputs. There are five common events that may be encountered during operation that can lead to advancement through the state machine. Each of these will be discussed in detail. The invention provides a means for monitoring the controllers, detecting errors during their operation, and switching control from the active controller to the standby controller. Switching of control from the active to standby controller is possible for both firmware and hardware component faults. Switchover may take place due to; a fault in the active controller, a voluntary relinquishing of control by the active controller or because an upgrade or maintenance is to be performed on the active controller. It will be apparent to those of skill in the art that the above list of failure mechanisms is not necessarily exhaustive and the invention is not limited to these mechanisms.

First, the simplest change of control occurs when the active controller relinquishes control in response to the standby controller forcibly taking control. This may occur when a controller is being readied for a software upgrade. In this scenario the active controller will issue a 'take over' bit to the FPGA indicating that it wants to relinquish control. The FPGA then relinquishes active status to the standby controller.

Second, there is the possibility of a software "hang" in the active controller, that results in a lack of activity with respect to the active controller. During operation the active controller must generate periodic trigger pulses to a mono-stable trigger (e.g. 214) which is configured with a 500 ms timeout. Should the mono-stable trigger timeout, the state machine will be forced into State 302, the Standby State.

Third, the standby controller may forcibly take control. When the standby controller wishes to take control it writes a take over bit i.e. step 303 and the state machine moves to state 304 (Take Over Active Status).

Fourth, either the active or standby controllers may be removed from the system during operation. This "removal" may be anticipated as in the case of a scheduled upgrade or it may be unanticipated as in the case of a failure of a controller or loss of communication with it. In the case of an anticipated removal of the active controller control would be transferred to the standby controller as above and the switch-over of control would be performed in the same fashion as for a standby controller. If the active controller is removed while in control (i.e. unanticipated) $\overline{\text{UActive}}$ for the standby goes high and the state machine advances to state 310 of decision front 324 (Normal Arbitration for Active Status). If the standby controller is removed $\overline{\text{UActive}}$ is kept high by the appropriate pull-up of cross-link 208 and there is no immediate effect on the operation of the active controller.

Finally, there will often be an arbitration of control during power-up of the active and standby controllers. Such arbitration could occur during any cycling of power. In almost all cases one of the controllers will power-up before the other and the first controller to power-up will become the active controller. However, it is possible for the active and standby controllers to power-up at essentially the same time. In this case the controller that is located on the board that is inserted in an even numbered slot of the midplane will become the active controller. This arbitration sequence occurs in decision front 324 of the state machine.

In the current embodiment the system of the invention is comprised by an industrial computer. In an alternative embodiment the system of the invention is implemented in physically separate computers. In this embodiment regions 220 and 222 of FIG. 1 are comprised by separate computers. Cross-link 208 is implemented in a manner appropriate for communications between computers. This includes, but is not limited to, conductive wiring and optical fibre. In another embodiment the computers containing regions 222 and 220 are located remotely from one another.

In the current embodiment the logic used for monitoring the status of and switching control between the active and standby controllers is implemented using hardware methods. The invention should not be limited to this implementation. In an alternative embodiment the logic could be implemented with appropriate software methods.

While the invention has been described according to what is presently considered to be the most practical and preferred embodiments, it must be understood that the invention is not limited to the disclosed embodiments. Those ordinarily skilled in the art will understand that various modifications and equivalent structures and functions may be made without departing from the spirit and scope of the invention as defined in the claims. Therefore, the invention as defined in the claims must be accorded the broadest possible interpretation so as to encompass all such modifications and equivalent structures and functions.

What is claimed is:

1. A system for managing redundant controllers:
   a plurality of monitors operable to receive status signals from a plurality of controllers associated with the plurality of monitors, wherein the plurality of controllers includes an active controller and a standby controller, wherein the plurality of monitors are operable to monitor the plurality of controllers;
   one or more communication links between the plurality of monitors, wherein the one or more communication links are operable to exchange status signals between the plurality of monitors;
   a plurality of triggers coupled to the plurality of monitors and the plurality of controllers, wherein the plurality of triggers provide signals for corresponding ones of the plurality of controllers.

2. The system of claim 1 wherein the plurality of monitors comprise logic for determining which of the plurality of controllers is the active controller and which is the standby controller.

3. The system of claim 1 wherein the system further comprises two resistors, one resistor being attached to each communications link for providing the proper state to the standby controller.

4. The system of claim 1 wherein the monitors are field programmable gate arrays.

5. The system of claim 1 wherein the logic is a state machine.

6. A computer suitable or use in an application requiring reliability of operation, the computer comprising:
   a first controller, the first controller operating as an active controller;
   a second controller, the second controller operating as a standby controller, wherein the second controller is capable of assuming the operations performed by the first controller, the first and second controller forming a pair of redundant controllers;
   a first logic device connected to and associated with the first controller, wherein the first logic device is suitable to receive status signals from the first controller;
   a second logic device connected to and associated with the second controller, wherein the second logic device is suitable to receive status signals from the second controller;
   two triggering means, each triggering means connected to and associated with a controller, the triggering means further connected to the logic device associated with the controller with which the triggering means is associated, the triggering means providing a signal to the controller; and
   two communications links providing for communications between the first and second logic devices.

7. A computer according to claim 6 wherein the fist and second logic devices comprise logic means for determining which controller is the active controller and which is the standby controller.

8. A computer according to claim 7 wherein the logic means is comprised by the first and second logic devices is a state machine.

9. A computer according to claim 6 wherein the first and second logic devices are field programmable gate arrays.

10. A computer according to claim 6 wherein the computer further comprises two resistors, one resistor being attached to each communications link for providing the proper state to the second controller.

11. A computer according to claim 6 wherein the triggering means are mono-stable triggers.

12. A computer according to claim 6 wherein a controller, the logic device associated with it, the triggering means associated with it are comprised by a board located within the computer.

13. A computer according to claim 12 wherein the communication links between the logic devices are conducting traces, the conducting traces being located on a board other than that on which controller, the logic device associated with it, the triggering means associated with it are comprised.

14. A computer according to claim 12 wherein the communication links between the logic devices are communications links suitable for connecting a first and second logic device which are located remotely from one another.

15. A state machine for the arbitration of control between two redundant controllers, the state machine being implemented as logic on a logic device wherein the state machine permits only one of the two redundant controllers to be an active controller, the two controllers being able to set status signals in a manner indicting either their current or future status, the state machine comprising:

an active state wherein the active controller resides in the active state when the redundant controllers are not arbitrating to determine the active controller;

a standby state wherein the controller that is not the active controller resides in the standby state when the controllers not arbitrating to determine the active controller;

a first decision front, the first decision front being entered when the standby controller forcibly attempts to become the active controller;

a second decision front, the second decision front being entered when the active controller requests to become the standby controller;

a third decision front, the third decision front being entered by the active controller when the active controller is to become the standby controllers; and wherein the active controller and the standby controller are monitored by a plurality of monitors.

16. A state machine according to claim 15 wherein the first decision front comprises a plurality of states corresponding to a plurality of clock cycles, through which the standby controller that is requesting to become the active controller must pass to become the active controller, the standby controller, in each state of the plurality of states, setting a status signal in a manner indicating it is the active controller.

17. A state machine according to claim 16 wherein there are three clock cycles.

18. A state machine according to claim 15 wherein the second decision front comprises:

a first state wherein the standby controller sets a status signal in a manner indicating it is the standby controller; and a second state wherein the standby controller sets a status signal in a manner indicating it is the standby controller, the second state being entered by the standby controller if an identification parameter is set at a certain value.

19. A state machine according to claim 18 wherein the controller that passes though one state of the second decision front becomes the active controller and the controller that passes through both states of the second decision front becomes the standby controller.

20. A state machine according to claim 18 wherein the identification parameter identifies a location on a midplane of an industrial computer in which the board on which the logic device comprising the state machine is located in an even or odd numbered slot.

21. A state machine according to claim 15 wherein the third decision front comprises:

a first state wherein the active controller sets a status signal in a manner indicating it is the active controller; and a second state wherein the active controller sets a status signal in a manner indicating it is the active controller, the second state being entered by the active controller if a status signal associated with the standby controller is set to indicate the standby controller is to be the active controller.

22. A method by which a standby controller forcibly becomes the active controller, the method comprising:

setting a parameter low by the standby controller, the parameter indicating that the standby controller is to forcibly become the active controller;

entering a first decision front of a state machine, the first decision front containing a plurality states;

setting a status signal of the standby controller to indicate it is the active controller; and maintaining the status signal of the standby controller to indicate it is the active controller throughout the plurality of states in the first decision front, wherein the active and standby controllers are operable to communicate status signals through monitors associated with the active and standby controllers, the monitors being able to monitor status signals of the controller with which they are associated and status signals of the controller with which they are not associated.

23. A method according to claim 22 wherein there are three states in the first decision front.

24. A method by which a standby controller becomes the active controller when the active controller has indicated it is to become the standby controller by setting a status signal indicating it is the active controller low; the method comprising:

setting a status signal of the standby controller high, indicating the standby controller is to remain the standby controller;

monitoring a status signal of the active controller, by the monitor associated with the standby controller;

remaining as the standby controller if the status signal of the active controller is set low;

setting a status signal of the standby controller high, indicating the standby controller is to remain the standby controller if an identification parameter of the standby controller has a certain value;

monitoring a status signal of the active controller, by the monitor associated with the standby controller; and remaining as the standby controller if the status signal of the active controller is set low, wherein the active and standby controllers are operable to communicate status signals through monitors associated with the active and standby controllers, the monitors being able to monitor status signals of the controller with which they are associated and status signals of the controller with which they are not associated.

25. An active controller and standby controller system, comprising:

means for setting a status signal of the active controller low, indicating the active controller is to remain the active controller;

means for monitoring a status signal of the standby controller, by the monitor associated with the active controller;

means for remaining as the active controller if the status signal of the standby controller is set high;

means for setting a status signal of the active controller high, indicating the active controller is to remain the active controller;

means for monitoring a status signal of the active controller, by the monitor associated with the standby controller; and means for remaining as the active controller if the status signal of the standby controller is set high, wherein the active and standby controllers are operable to communicate status signals through monitors associated with the active and standby controllers, the monitors being able to monitor status signals of the controller with which they are associated and status signals of the controller with which they are not associated.

* * * * *